(12) United States Patent
Leisten et al.

(10) Patent No.: US 8,167,231 B2
(45) Date of Patent: May 1, 2012

(54) SHIELDING ARRANGEMENT FOR LINES, IN PARTICULAR ELECTRICAL LINES, IN AIRCRAFT

(75) Inventors: Volker Leisten, Wedel (DE); Frank Falow, Buxtehude (DE); Holger Frauen, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 683 days.

(21) Appl. No.: 12/316,201

(22) Filed: Dec. 10, 2008

(65) Prior Publication Data

US 2009/0184199 A1    Jul. 23, 2009

Related U.S. Application Data

(60) Provisional application No. 61/008,692, filed on Dec. 21, 2007.

(51) Int. Cl.
*B64D 45/00* (2006.01)
(52) U.S. Cl. .......................................... 244/1 A
(58) Field of Classification Search .................. 244/1 A, 244/117 R, 119, 118.5, 118.6, 133, 121; 174/384; 361/218, 816
See application file for complete search history.

(56) References Cited

U.S. PATENT DOCUMENTS

| | | | | |
|---|---|---|---|---|
| 3,761,603 A | * | 9/1973 | Hays et al. | 174/101 |
| 4,896,940 A | * | 1/1990 | Kathiresan et al. | 385/112 |
| 5,670,742 A | * | 9/1997 | Jones | 174/384 |
| 5,763,824 A | * | 6/1998 | King et al. | 361/816 |
| 6,249,913 B1 | * | 6/2001 | Galipeau et al. | 725/76 |
| 6,585,189 B1 | * | 7/2003 | Smallhorn | 244/118.5 |
| 6,674,000 B2 | * | 1/2004 | Lambiaso | 174/50 |
| 6,743,976 B2 | * | 6/2004 | Motzigkeit | 174/486 |
| 7,255,602 B1 | * | 8/2007 | Driessen et al. | 439/607.47 |
| 7,408,114 B2 | * | 8/2008 | VanderVelde et al. | 174/68.3 |
| 7,589,286 B2 | * | 9/2009 | VanderVelde et al. | 174/480 |
| 7,938,362 B2 | * | 5/2011 | Kismarton et al. | 244/117 R |

FOREIGN PATENT DOCUMENTS

| | | |
|---|---|---|
| DE | 102 23 840 | 12/2003 |
| EP | 0 588 174 | 3/1994 |
| EP | 0 835 049 | 9/1997 |

OTHER PUBLICATIONS

Office action cited in corresponding DE application 10 2007 061 111.8.

* cited by examiner

*Primary Examiner* — Galen Barefoot

(74) *Attorney, Agent, or Firm* — Greer, Burns & Crain, Ltd.

(57) ABSTRACT

A shielding arrangement for the lightning protection of electrical lines and components in an aircraft includes a protected installation space for receiving the lines that is arranged in the region of a floor framework, at least one delimiting surface of the installation space being provided at least in certain regions with an electrically conductive shielding, the at least one delimiting surface of the installation space being formed with at least one floor panel and a further delimiting surface of the installation space being formed with at least one ceiling panel.

15 Claims, 2 Drawing Sheets

SHIELDING ARRANGEMENT FOR LINES, IN PARTICULAR ELECTRICAL LINES, IN AIRCRAFT

CROSS-REFERENCE TO RELATED APPLICATIONS

This application claims the benefit of U.S. Provisional Application No. 61/008,692, filed Dec. 21, 2007, the entire disclosure of which is herein incorporated by reference.

FIELD OF THE INVENTION

The invention relates to a shielding arrangement, in particular for the lightning protection of electrical lines and components in aircraft, having a protected installation space for receiving the lines that is arranged in particular in the region of a floor framework.

BACKGROUND OF THE INVENTION

In aircraft construction, composite materials, in particular carbon fiber reinforced epoxy resins (CRP material), are increasingly being used for the production of wings, vertical and horizontal tail surfaces and for fuselage cells of aircraft. As a result of the considerably reduced electrical conductivity in comparison with conventional aluminum fuselages of a fuselage cell that is produced for example with a CRP material, there is reduced protection of the onboard electrical systems within the aircraft, which are generally highly sensitive, with respect to external electromagnetic disturbances. These external electromagnetic disturbances are, for example, lightning strikes, radio waves and radar waves with a high field strength or the like. In addition, sources of electromagnetic interference may also be present within the fuselage cell of an aircraft itself, such as for example passengers' telecommunications equipment or portable data-processing systems, which often emit high-frequency and pulsed electromagnetic radiation. Therefore, all installations must be implemented in such a way that the sensitive onboard electrical and electronic systems, in particular the flight computer, the electronic control systems for the active aerodynamic areas of the aircraft, electrical emergency systems and the engine control are not impaired in their function in any way by such disturbances.

To minimize the interference of such onboard electrical systems by such electromagnetic disturbances, a large number of measures are widely taken. For example, twisted-together forward and return conductors or laying of lines in the vicinity of metal structures, such as for example on seat rails, stringers, ring frames or the like, may be used for the cabling of the onboard electrical systems of the aircraft. Furthermore, to achieve a particularly good shielding effect, metal meshes are used for enclosing the electrical lines and/or metal cable ducts in which the unshielded lines run. All the measures may be used on their own or in combination with one another. Both the shielding meshes, which are for example pulled over the lines from the outside in the form of net-like tubes, and the metal cable ducts always lead to a considerable extra weight of the overall cabling—quite apart from increased installation effort and a restriction of the laying paths available. In addition, the shielding meshes and the metal cable ducts make subsequent modification of the electrical installation more difficult. Furthermore, additional, generally weight-increasing, measures have to be taken in the cable ducts to avoid impairment of the mechanical integrity of the insulation of the lines, for example in the form of chafing through. However, the use of twisted conductor arrangements and/or laying in the vicinity of metal structures in the aircraft is often unsatisfactory with respect to the achievable degree of the electromagnetic protective effect, or means increased restriction on routing. On the other hand, direct integration of an electromagnetically fully effective protective mesh in the CRP fuselage cell of the aircraft would largely nullify the weight advantages of the composite material.

On account of the disadvantages of the known shielding measures for electrical lines set out above, they are only recommendable with reservations for use in aircraft with CRP fuselages.

SUMMARY OF THE INVENTION

One of the objects of the invention is therefore to avoid the disadvantages described above of the known embodiments of shieldings of lines in aircraft from sources of electromagnetic disturbance.

Accordingly, a shielding arrangement for the lightning protection of electrical lines and components in an aircraft comprises a protected installation space for receiving the lines that is arranged in the region of a floor framework, at least one delimiting surface of the installation space being provided at least in certain regions with an electrically conductive shielding, the at least one delimiting surface of the installation space being formed with at least one floor panel and a further delimiting surface of the installation space being formed with at least one ceiling panel. The at least one delimiting surface may be formed with a plurality of floor panels and the further delimiting surface may be formed with a plurality of ceiling panels.

The fact that at least one delimiting surface of the installation space is provided at least in certain regions with an electrically conductive shielding produces effective shielding of a large-volume installation space for lines, in particular electrical lines, and other items of equipment or components, with respect to external electromagnetic disturbance fields, with at the same time low additional weight, since components that are present in any case in the fuselage cell, such as for example floor panels, ceiling lining panels, lining elements or other structural elements, can also be used as a delimiting surface to define the installation space. At the same time, other physical properties of the components within the fuselage cell, such as for example their mechanical strength or their burning-through characteristics, can be specifically optimized by the shielding.

The components or items of equipment that are protected by the installation space may be any electronic and/or electrical devices or else metal pipelines, compartments or the like, since the electromagnetic fields that interfere with metal pipelines for oxygen or water, for example, can likewise induce high voltages, which can lead to spark formation with the risk of explosion or to sparkovers and disruptive discharges.

In addition, installation of the electrical line systems in a fuselage cell of an aircraft is made considerably easier, since there is no longer any need for shielding meshes or shielding tubes for enclosing the lines, metal cable ducts or special forms of cable with twisted conductor arrangements. Previously existing restrictions with respect to the laying paths or line routing to be maintained, for example in the form of the requirement not to allow sensitive lines to run or be grouped in the vicinity of electrically conductive components in the fuselage cell in order to improve the immunity to interference, no longer need to be observed. Rather, the lines to be protected can be placed almost at will in the installation space and, if required, fixed in their position there. Conventional line laying without special shielding measures is generally entirely adequate. Any crosstalk between parallel running electrical lines within the installation space is avoided by the safety distances between the respective cables that are defined in any case. Measures beyond this for electromagnetic shielding are no longer required.

One embodiment of the shielding arrangement provides that the at least one delimiting surface is formed in a planar manner and/or curved at least in one direction of the space.

As a result, a space-saving adaptation of the shielded installation space for the protection of the electrical lines to the spatial conditions available is possible, which is of significance in particular in the case of the generally very confined space conditions within aircraft fuselage cells.

In accordance with a further configuration of the shielding arrangement, the at least one delimiting surface encloses the installation space as completely as possible.

As a result of the substantially completely uninterrupted delimiting surface, a particularly effective shielding effect of the installation space and of the electrical lines running in it is achieved with respect to external electromagnetic disturbance fields.

According to a further embodiment of the shielding arrangement, the electrical conductivity of the shielding varies from region to region.

This configuration makes local adaptation of the shielding effect to the respective local conditions possible. For example, the conductivity of the shielding, which is generally correlated with the layer thickness of the shielding, can be increased in the region of components that are particularly relevant to safety, in order to increase the immunity to interference. Moreover, the weight of the required electrical shielding can be optimized by local variation of the conductivity.

In accordance with one embodiment of the shielding arrangement, the electrical conductive shielding is provided at least in certain regions with an insulating layer.

As a result, impairment of the integrity of the electrical insulation of the lines running in the installation space, for example by vibration-induced chafing through and resultant short-circuits, is avoided.

A further embodiment of the shielding arrangement provides that the electrically conductive shielding of the installation space is connected to a central earthing system of the aircraft.

The connection to the central earthing system makes a particularly effective shielding effect from external disturbing electromagnetic influences possible, since other electrical devices of the aircraft are then also connected to the shielding and the central earthing system.

In accordance with a further embodiment of the shielding arrangement, it is provided that the electrically conductive shielding serves as a return conductor for further onboard electrical systems.

As a result, the number of electrical lines necessary for cabling an onboard electrical system of an aircraft can be reduced, since a separate return conductor does not have to be provided for each line leading to an electrical component. The effect of the reduction of the required number of lines occurs in particular in the case of fuselage cells that do not have adequately high (intrinsic) electrical conductivity (current carrying capacity), as is the case for example with fuselage cells produced predominantly with CRP materials or with other fiber reinforced plastics, to ensure failsafe operation of all the electronic and electrical components in all operating states of the aircraft occurring.

BRIEF DESCRIPTION OF THE DRAWINGS

The present invention is explained in more detail below using preferred exemplary embodiments and with reference to the attached figures of the drawings, in which.

In the figures, like reference numbers refer to identical or functionally identical components unless otherwise stated.

DETAILED DESCRIPTION OF THE INVENTION

Figure 1:
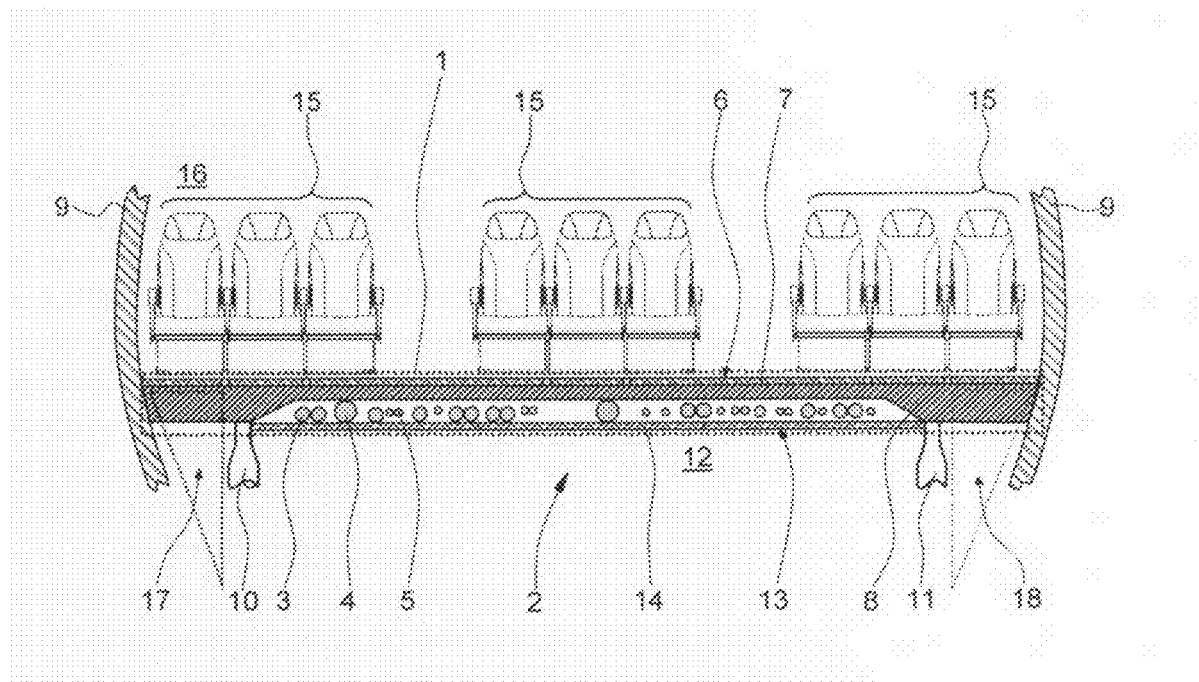
FIG. 1 shows a cross-sectional representation through a fuselage cell of an aircraft with a floor framework with an installation space for lines, in particular electrical lines, arranged in it that is largely protected from external electromagnetic disturbance fields.

FIG. 1 shows a schematic cross section through a fuselage cell of an aircraft with a protected installation space.

A protected installation space 1 is formed within a floor framework 2. Located substantially perpendicularly to the plane of the drawing inside the installation space 1, which is symbolized by the dotted representation of a rectangular outline, are a plurality of lines and components, in particular electrical lines and components, of which only three lines 3, 4, 5 are provided with a reference numeral as representative of the others.

Lines branches that run parallel to the plane of the drawing are not represented. In addition to the electrical lines, lines of any type, such as for example hydraulic lines, water and waste-water lines, ventilating and venting lines, air-conditioning lines or the like, may be arranged in the installation space 1.

The installation space 1 is closed off in the upward direction by a delimiting surface 6, which is formed by a plurality of floor panels 7 substantially adjoining one another. The floor panels 7 are fastened on a metal transverse beam 8 by suitable fastening elements, such as for example metal screws or rivets, which are not represented in FIGS. 1, 2. The transverse beam 8 is formed e.g. with an aluminum alloy material and is connected on both sides to ring frames of a substantially non-conducting CRP fuselage-cell structure 9 of an aircraft that is not represented. In a fuselage cell produced substantially completely with CRP materials, the transverse beams are also generally produced with CRP materials, further increasing the necessity for protective measures. The installation space 1 is in this case particularly advantageously suitable for receiving electrical lines or cables that run transversely in relation to the longitudinal axis of the aircraft and can no longer be arranged in the vicinity of a metal transverse beam.

Provided under the transverse beam 8 are two supporting rods 10, 11 (Samer rods) for further supporting the transverse beam 8. In the downward direction, with respect to a cargo hold 12, the protected installation space 1 is closed off by a further delimiting surface 13, which is formed by a plurality of ceiling panels adjoining one another—of which only one ceiling panel 14 bears a reference numeral. Arranged above the floor panels 7 are a plurality of passenger seats 15 in a passenger compartment 16 of the aircraft. Both the floor panels 7 and the ceiling panels 14 are provided on both sides with an electrically conductive shielding that is not represented in FIGS. 1, 2, in order to create the protected installation space 1. Both the floor panels 7 and the ceiling panels 14 are usually sandwich panels with a core structure, for example of a honeycomb form, of impregnated Nomex® paper, which are formed on both sides with outer layers of a fiber reinforced plastics material. Both outer layers may be provided with electrically conductive shielding, which may be applied for example in the form of a metal foil, metallic vapour deposition, metallization, a woven metal fabric, a nonwoven metal fabric, an electrically conductive plastics material or any combination thereof. If the core structure is, for example, a folded honeycomb core structure, the shielding effect that can be achieved by this may be adequate, so that it is possible to dispense with a separate conductive coating of the outer layers of the floor panels 7 and the ceiling panels 14.

Figure 2:
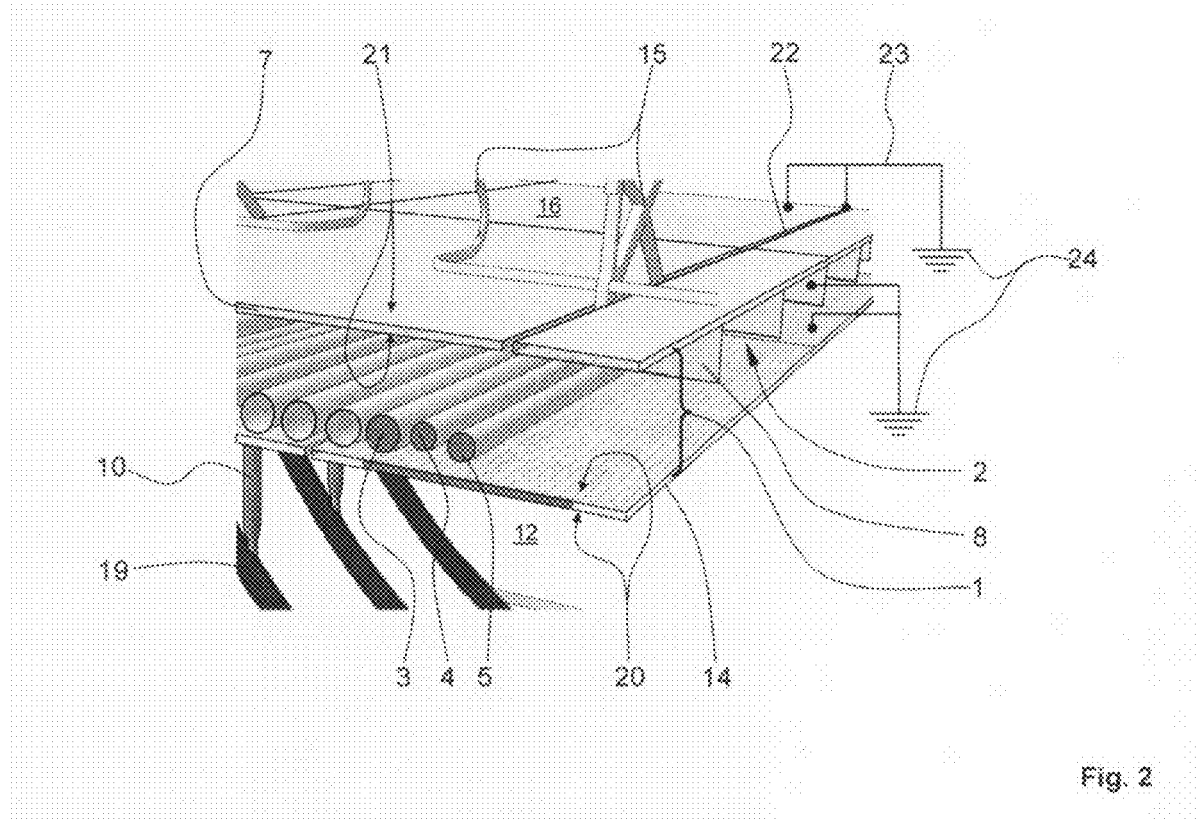
FIG. 2 shows a perspective oblique view of the floor framework with the protected installation space.

In the region of two substantially triangular interstices 17, 18, there are no ceiling panels and no lateral shieldings following the inner contour of the CRP fuselage cell structure, so that the shielding effect from disturbing electromagnetic radiation interfering with the protected installation space 1 is reduced. In a configurational variant that is not shown, additionally arranged in the region of the interstices 17, 18 are curved shieldings, which together with the floor panels 7 and the ceiling panels 14 represent a largely uninterrupted, electrically conducting shielding (substantially closed, electrically conductive enveloping surface) with a high shielding effect even from disturbing radiation entering the protected installation space 1 laterally. FIG. 2 shows a perspective view of the floor framework with the protected installation space.

The floor panels 7 rest on a plurality of transverse beams, of which only the front transverse beam 8 is provided with a reference numeral, while the ceiling panels 14 of the cargo hold 12 are fastened to or suspended from the underside of the transverse beams 8. The front transverse beam 8 is supported on a ring frame 19 by means of the Samer rod 10. Both the floor panels 7 and the ceiling panels 14 are respectively provided on both sides with an electrically conductive shielding 20, 21. The electrically conductive shieldings 20, 21 on the floor and ceiling panels 7, 14 may be formed by metal foils, metallic vapour deposition, metallization, a woven metal fabric, nonwoven metal fiber fabrics, electrically conductive plastics materials or any combination thereof. In the case where the floor and ceiling panels are formed in the sandwich type of construction, the electrically conductive shielding may, for example, be produced by an electrically conductive folded honeycomb core, for example a folded honeycomb core produced with a metallized Nomex® paper. The electrical conductivity of the shieldings may vary locally, in order if required to increase the shielding effect of the installation space 1 in the region of lines that are particularly relevant to flight safety. This may be achieved, for example, by different material thicknesses of the metallization and/or a combination of different metals (copper, silver, gold, etc.). Moreover, the shielding 20, 21 allows further physical properties—for example the burning-through characteristics, the so-called "impact" behaviour, i.e. including the penetration resistance with respect to parts flying around with high kinetic energy in the event of engine defects, or the mechanical strength—of the floor panels 7, the ceiling panels 14 and further components serving for the shielding to be specifically optimized.

As a result of the electrically conductive shieldings 20, 21 running on the upper side and underside of the protected installation space 1, external electromagnetic disturbance fields cannot have a disturbing influence on the electrical lines 3, 4, 5 running in the protected installation space 1. A number of metal seat rails, running in a longitudinal direction of the CRP fuselage cell structure and formed for example with an aluminum alloy material, only one of which is provided with a reference numeral 22, are arranged on the transverse beams of the floor framework 2. Between the seat rails, which are arranged such that they run substantially parallel to and at a distance from one another and serve, inter alia, for fixing the passenger seats 15, the floor panels 7 are placed and fastened on the transverse beams lying thereunder. The seat rails 22 and the transverse beams 8 run at an angle of approximately 90° to one another and together form the grid-shaped floor framework to create the required support for the floor panels 7 and the fastening of the passenger seats 15 in the passenger compartment 16 of the aircraft. At the same time, this grid itself forms an at least coarsely meshed Faraday's cage.

To achieve a shielding effect of the protected installation space 1 that is as effective as possible, the floor panels 7, the ceiling panels 14, the transverse beams 8 and the seat rails 22 are respectively connected to one another in an electrically conducting manner by means of suitable metal fastening elements, in particular by screws, riveted connections, clamped connections or the like. The components mentioned may be additionally connected to a central earthing system 24 of the aircraft by respective earthing lines 23. Furthermore, it is possible to use the electrically conductive shieldings 20, 21 themselves as return conductors for the lines 3, 4, 5, in order to obviate the need for separate return lines for current return.

Figure 3:
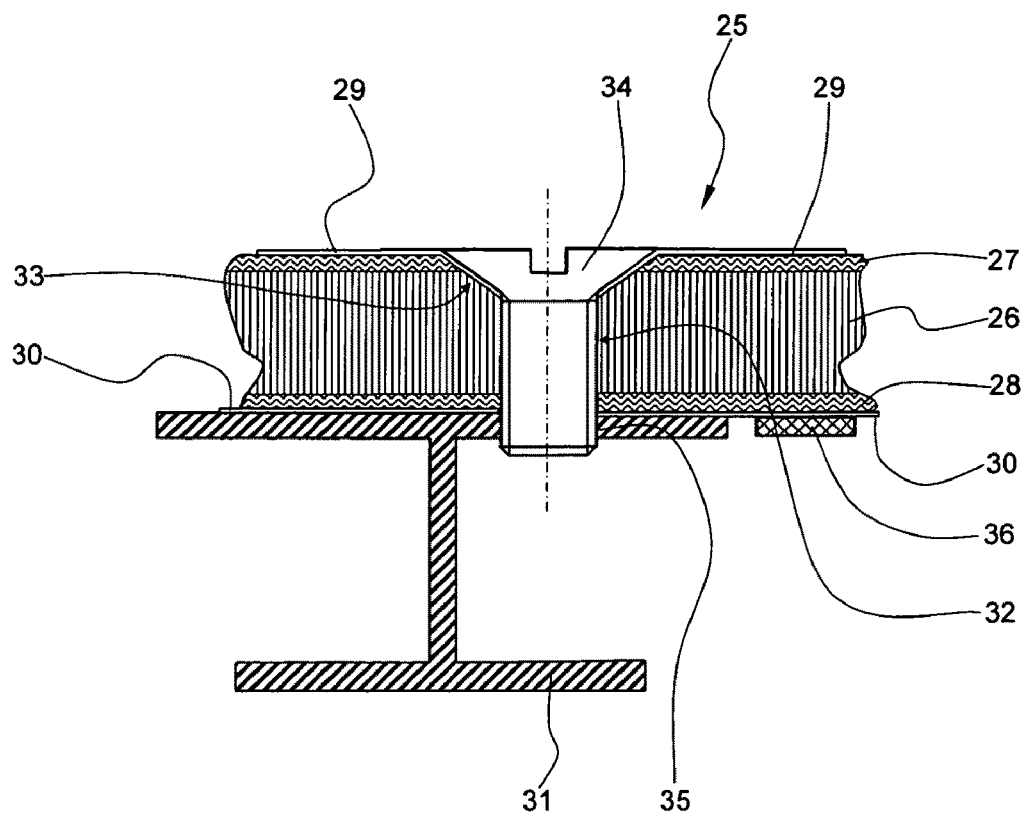
FIG. 3 shows a sectional representation through a floor panel or ceiling panel as a delimiting surface for the protected installation space.

FIG. 3 shows an exemplary cross section through a floor panel for forming a delimiting surface of the protected installation space.

A floor panel 25 has a sandwich construction with a core structure 26 and outer layers 27, 28 applied to the core structure 26 on both sides. Both outer layers 27, 28 are respectively provided with an electrically conductive shielding 29, 30, for example over the full surface area. The electrically conductive shielding 29, 30 may, if required, be formed region by region, have locally different material thicknesses and be formed locally with different metals or metal alloys. Both outer layers 27, 28 may be formed, for example, with a carbon fiber reinforced epoxy resin, a glass fiber reinforced phenolic resin or other fiber reinforced thermosetting plastics. The core structure 26 generally has a geometric shape of a honeycomb form and is formed from Nomex® paper impregnated with a phenolic resin, the longitudinal axes of the honeycomb cells respectively running substantially perpendicularly to the surface of the panel. Alternatively, fiber reinforced thermoplastics may also be used for producing the outer layers 27, 28 and/or the core structure 26.

Serving, for example, for fastening the floor panel 25 on a transverse beam 31 of a floor framework that is not represented in FIG. 3 is a cylindrical fastening bore 32 with a frustoconical countersink 33, in which there is inserted a metal fastening screw 34, which is screwed with a threaded bore 35 in the transverse beam 31. In the region of the frustoconically shaped countersink 33, at least the upper electrically conductive shielding 29 is "debossed through", that is to say the shielding 29 extends into the region of the countersink 33, right up to the cylindrical fastening bore 32. As a result of this configuration, a continuously electrically conductive contact is created between the shielding 29, the conductive metal fastening screw 34 and the transverse beam 31, which is likewise formed for example in an electrically conducting manner.

The substantially completely uninterrupted shielding surface of the installation space 1 has the effect that its electrical shielding effect is further optimized. In principle, fastening elements of all kinds, such as for example riveted or clamped connections, may take the place of the metal fastening screw 34, it having to be ensured however that a contact that is as continuous as possible is produced between the shielding of the floor panels 25 and the transverse beams 31 or the seat rail profiles of the floor framework. The construction of the floor panel 25 described in detail above substantially corresponds to the construction of a ceiling panel that is used for lining the ceiling of the cargo hold 12.

One or both electrically conductively formed shieldings 29, 30 may be provided in certain regions or over the full surface area with an insulating layer 36, in order for example to prevent the vibration-induced chaffing through of cable insulations of the electrical lines 3, 4, 5 laid in the protected installation space 1 (cf. FIGS. 1, 2) and resultant short-circuits.

For the case where a core structure 26 of the floor panel 25, configured for example as a sandwich panel, is formed in an electrically conductive manner in order to create an inner electrically conductive shielding, rivets spreading out in a radial direction are particularly well-suited for fastening the floor panel 25 on the transverse beam 31, since an electrical contact between the then inner shielding and the likewise electrically conductive transverse beam 31 is created by the rivet widening in a radial direction during the setting operation. Apart from the floor panels and ceiling panels, any other components of the fuselage cell structure of the aircraft may be provided with a correspondingly configured electrically conductive shielding to form and/or add further to the protected installation space 1.

As a departure from the exemplary embodiment described, the installation space 1 may also be used in other regions of the aircraft in which similar shielding problems occur—presupposing a corresponding geometric shape. For example, the creation of such installation spaces is conceivable for installations in what is known as the "crown area" above the "hat racks" in the region of the ceiling lining of a passenger aircraft cabin, or else, if required, in wet cells, such as for example in sanitary or galley modules.

What is claimed is:

1. An electromagnetic shielding arrangement for the lightning protection of electrical lines and components in an aircraft, the electromagnetic shielding arrangement comprising:
    a protected installation space for receiving the lines, that is arranged in the region of a floor framework, and
    at least one delimiting surface of the protected installation space being provided at least in regions with an electrically conductive shielding,
    wherein the at least one delimiting surface of the protected installation space is formed with at least one floor panel and a further delimiting surface of the protected installation space is formed with at least one ceiling panel, and
    wherein the floor panels and the ceiling panels are configured as sandwich panels, comprising electrical conductive shielding over their full surface area, and on both sides.

2. The shielding arrangement according to claim 1, wherein the least one delimiting surface is formed in a planar manner, and curved at least in one direction of the space.

3. The shielding arrangement according to claim 1, wherein the at least one delimiting surface encloses the installation space completely.

4. The shielding arrangement according to claim 1, wherein the electrical conductivity of the shielding varies from region to region.

5. The shielding arrangement according to claim 1, wherein electrically conductive shielding is insulated at least in certain regions.

6. The shielding arrangement according to claim 1, wherein the electrically conductive shielding is connected to a central earthing system of the aircraft.

7. The shielding arrangement according to claim 1, wherein the electrically conductive shielding serves as a return conductor for onboard electrical systems.

8. The shielding arrangement according to claim 1, wherein the floor panels are fixed on transverse beams of the floor framework and the ceiling panels are fixed under the transverse beams by fastening elements.

9. The shielding arrangement according to claim 8, wherein the fastening elements are electrically conductive fastening screws.

10. The shielding arrangement according to claim 1, wherein the electrically conductive shielding is formed with a metal foil, metallic vapour deposition, metallization, a woven metal fabric, a nonwoven metal fabric, an electrically conductive plastics material, and any combination thereof.

11. The shielding arrangement according to claim 8, wherein the transverse beams are formed with an electrically conductive material.

12. The shielding arrangement according to claim 11, wherein the transverse beams are formed with at least one of an aluminum alloy material and a CRP material.

13. The shielding arrangement according to claim 1, wherein seat rails formed with an electrically conductive material are arranged on the transverse beams.

14. The shielding arrangement according to claim 13, wherein the seat rails are formed of at least one of an aluminum alloy material and a titanium alloy material.

15. The shielding arrangement according to claim 1, wherein the electrically conductive shielding of the floor panels and the ceiling panels is debossed through, at least on one side, in the region of fastening bores, to create an electrically conductive connection between transverse beams, floor panels, ceiling panels and seat rails.

\* \* \* \* \*